(12) United States Patent
Ohara

(10) Patent No.: US 10,917,482 B2
(45) Date of Patent: Feb. 9, 2021

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Chie Ohara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/529,052

(22) Filed: Aug. 1, 2019

(65) Prior Publication Data

US 2020/0304582 A1    Sep. 24, 2020

(30) Foreign Application Priority Data

Mar. 22, 2019    (JP) .................................. 2019-054460

(51) Int. Cl.
*H04L 29/08* (2006.01)
*H04L 12/58* (2006.01)
*H04L 29/12* (2006.01)

(52) U.S. Cl.
CPC .............. *H04L 67/18* (2013.01); *H04L 51/08* (2013.01); *H04L 61/1594* (2013.01)

(58) Field of Classification Search
None
See application file for complete search history.

(56) References Cited

U.S. PATENT DOCUMENTS

| | | | |
|---|---|---|---|
| 2006/0135181 A1* | 6/2006 | Dale | ..................... H04W 64/00 455/456.5 |
| 2010/0145808 A1 | 6/2010 | Hilbert et al. | |
| 2015/0172858 A1* | 6/2015 | Choi | .................... H04M 1/2745 455/456.1 |
| 2017/0272393 A1* | 9/2017 | Nimushakavi | ...... H04L 12/1822 |

FOREIGN PATENT DOCUMENTS

| | | |
|---|---|---|
| JP | 2010-136332 A | 6/2010 |
| JP | 2015-176577 A | 10/2015 |

* cited by examiner

*Primary Examiner* — Brian Whipple
(74) *Attorney, Agent, or Firm* — Oliff PLC

(57) ABSTRACT

An information processing apparatus includes an acquisition unit that acquires position information about a position of a second user, and a reporting unit that, in a case of a first user making contact with the second user, when reporting contact information that is information uniquely specifying the second user, alters the contact information according to the position information and reports the altered contact information to the first user.

20 Claims, 18 Drawing Sheets

FIG. 6

| EMAIL ADDRESS | LAST USED | POSITION INFORMATION (LOCATION/PROBABILITY) | CONTACT INFORMATION/ PROVISION METHOD |
|---|---|---|---|
| REGISTERED | TODAY | IN THE OFFICE (HIGH) | SEAT INFORMATION & FACE PHOTO/IMAGE OUTPUT |
| REGISTERED | LESS THAN A WEEK AGO | IN THE OFFICE (MEDIUM) | SEAT INFORMATION & FACE PHOTO/IMAGE OUTPUT |
| REGISTERED | MORE THAN A WEEK AGO | IN THE OFFICE (LOW) | EMAIL ADDRESS/ IMAGE OUTPUT |
| UNREGISTERED | | OUTSIDE THE OFFICE (LOW) | EMAIL ADDRESS/ EMAIL TRANSMISSION |

FIG. 7

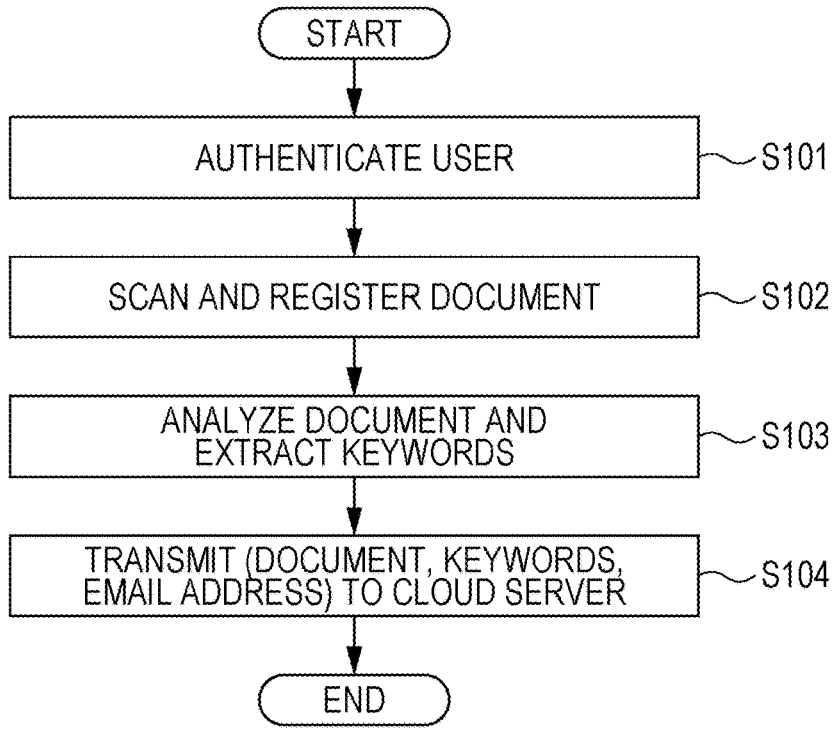

FIG. 11

| DETECTION RESULT | DISTANCE TO PORTABLE TERMINAL | POSITION INFORMATION | CONTACT INFORMATION/ PROVISION METHOD |
|---|---|---|---|
| SAME ID DETECTED | ON THE SAME FLOOR | ON THE SAME FLOOR | SEAT INFORMATION & FACE PHOTO/DISPLAY |
| SAME ID DETECTED | ANOTHER FLOOR | ON ANOTHER FLOOR OF THE OFFICE | FLOOR INFORMATION & FACE PHOTO/IMAGE OUTPUT |
| NOT DETECTED | | OUTSIDE THE OFFICE | EMAIL ADDRESS/ EMAIL TRANSMISSION |
| | | | |

FIG. 12

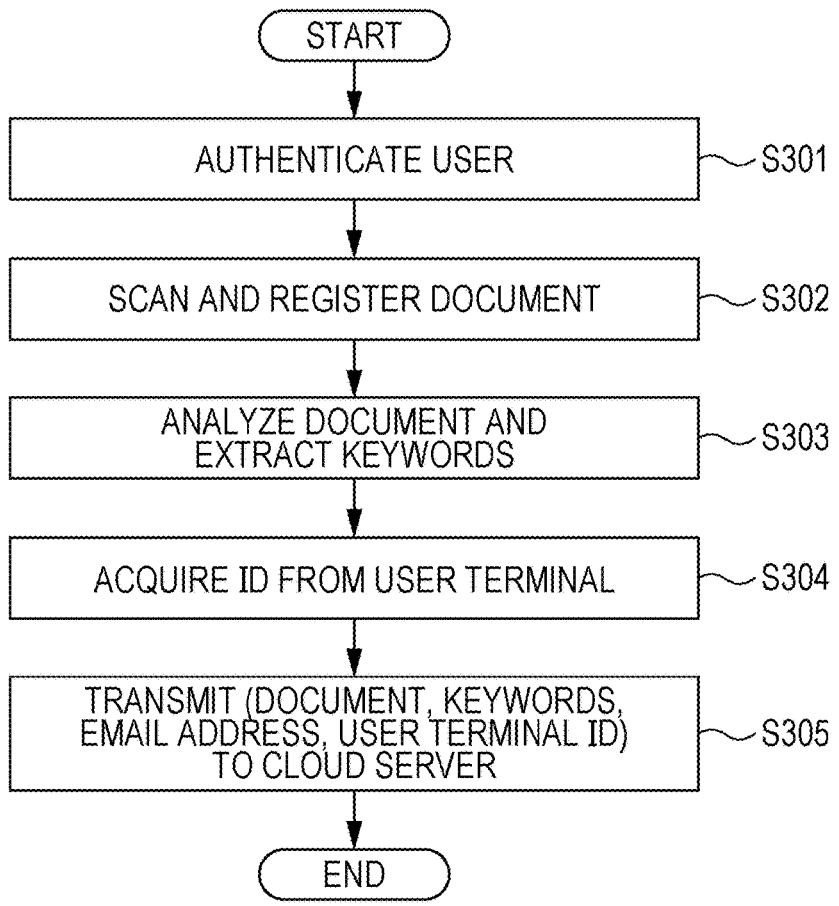

FIG. 14

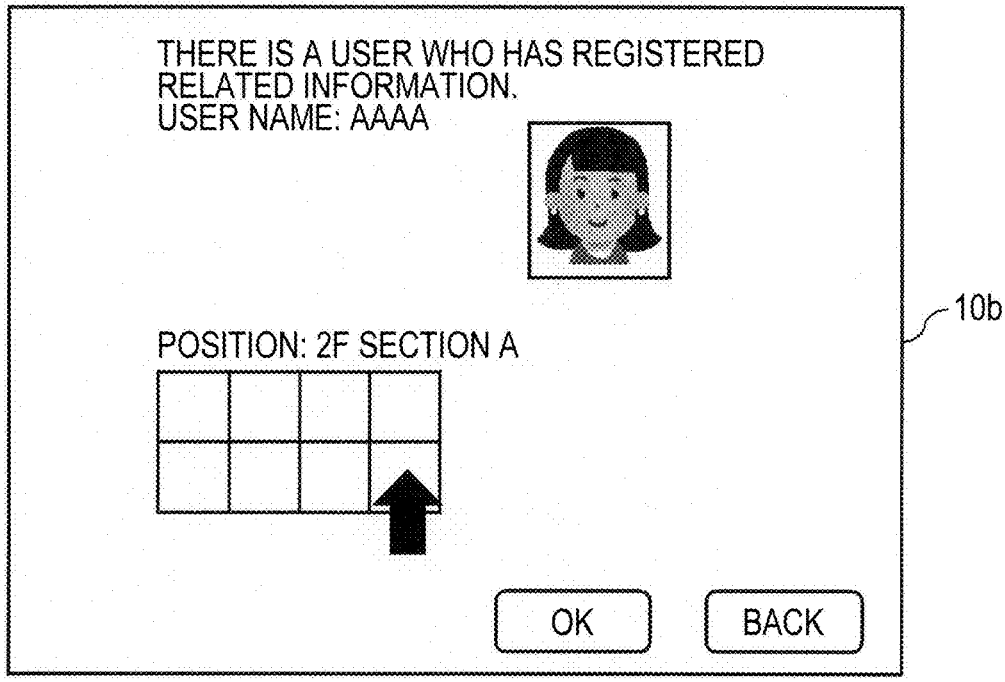

FIG. 15

| EMAIL ADDRESS | USER TERMINAL POSITION | POSITION INFORMATION | CONTACT INFORMATION/ PROVISION METHOD |
|---|---|---|---|
| REGISTERED | IN OPEN AREA | IN THE OFFICE/OPEN AREA | FACE PHOTO/IMAGE OUTPUT |
| REGISTERED | IN SECURITY AREA | IN THE OFFICE/ SECURITY AREA | REDETECT ON NEXT LOGIN |
| REGISTERED | OUTSIDE THE OFFICE | OUTSIDE THE OFFICE | REDETECT ON NEXT LOGIN |
| UNREGISTERED | | OUTSIDE THE OFFICE | EMAIL ADDRESS/ EMAIL TRANSMISSION |

FIG. 16

| EMAIL ADDRESS | USER TERMINAL POSITION | POSITION INFORMATION | CONTACT INFORMATION/ PROVISION METHOD |
|---|---|---|---|
| REGISTERED | IN OPEN AREA | IN THE OFFICE/OPEN AREA | FACE PHOTO/IMAGE OUTPUT |
| REGISTERED | IN SECURITY AREA | IN THE OFFICE/ SECURITY AREA | IN SECURITY AREA/DISPLAY |
| REGISTERED | OUTSIDE THE OFFICE | OUTSIDE THE OFFICE | OUTSIDE THE OFFICE/ DISPLAY |
| UNREGISTERED | | OUTSIDE THE OFFICE | EMAIL ADDRESS/ EMAIL TRANSMISSION |

FIG. 17

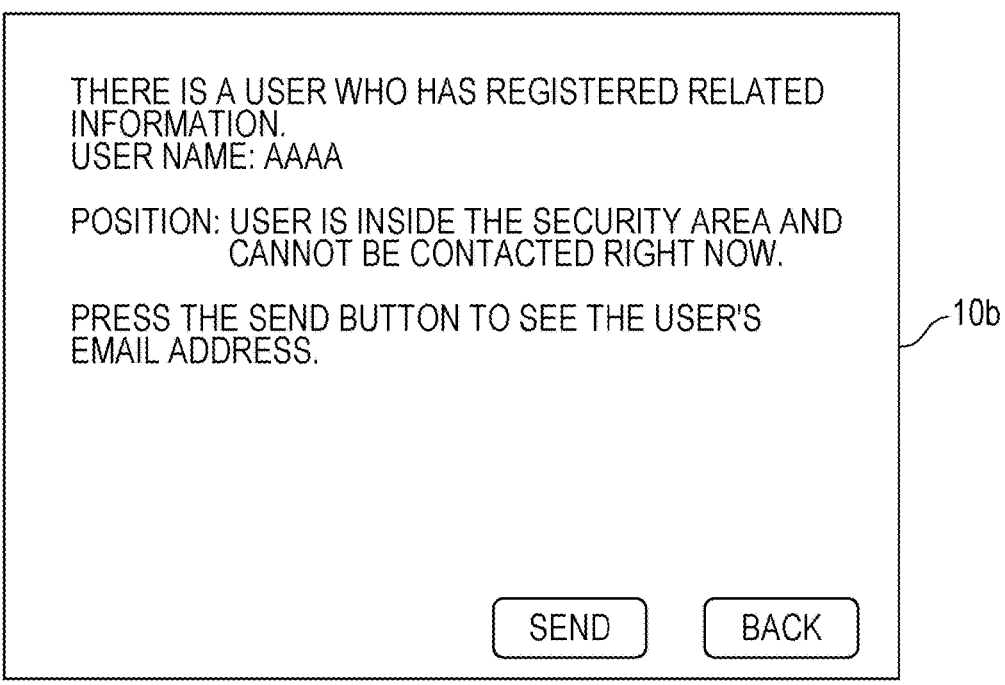

FIG. 18

| AFFILIATED CAMPUS | REGISTRANT TYPE | COURSE COMPLETION REGISTRATION INFORMATION | LECTURE SCHEDULE | CURRENT STATUS INFORMATION | CONTACT INFORMATION/ PROVISION METHOD |
|---|---|---|---|---|---|
| SAME CAMPUS | STUDENT | COMPLETED SAME LECTURE | LECTURE ON SAME DAY | RECEIVING SAME LECTURE AS REGISTRANT ON SAME DAY | NAME, FACE PHOTO, LECTURE NAME/ IMAGE OUTPUT |
| SAME CAMPUS | STUDENT | COMPLETED SAME LECTURE | LECTURE ON DIFFERENT DAY | RECEIVING SAME LECTURE AS REGISTRANT ON DIFFERENT DAY | NAME, FACE PHOTO, LECTURE NAME, EMAIL ADDRESS/ EMAIL TRANSMISSION |
| SAME CAMPUS | STUDENT | COMPLETED OTHER LECTURE | | NOT RECEIVING SAME LECTURE AS REGISTRANT | NAME, EMAIL ADDRESS/ EMAIL TRANSMISSION |
| SAME CAMPUS | PROFESSOR | COMPLETED LECTURE BY SAME PROFESSOR | LECTURE ON SAME DAY | RECEIVING LECTURE BY REGISTRANT ON SAME DAY | NAME, LECTURE NAME/ IMAGE OUTPUT |
| SAME CAMPUS | PROFESSOR | COMPLETED LECTURE BY SAME PROFESSOR | LECTURE ON DIFFERENT DAY | RECEIVING LECTURE BY REGISTRANT ON DIFFERENT DAY | NAME, LECTURE NAME, OFFICE LOCATION, SEAT INFORMATION/IMAGE OUTPUT |
| SAME CAMPUS | PROFESSOR | COMPLETED LECTURE BY OTHER PROFESSOR | | NOT RECEIVING LECTURE BY REGISTRANT | NAME, OFFICE LOCATION, SEAT INFORMATION/IMAGE OUTPUT |
| OTHER CAMPUS | | | | | NAME, EMAIL ADDRESS/ EMAIL TRANSMISSION |

FIG. 19

| LOGIN INFORMATION | REGISTRANT HEALTH STATUS | REGISTRANT'S ASSIGNED NURSING STAFF ID | CURRENT STATUS INFORMATION | CONTACT INFORMATION/ PROVISION METHOD |
|---|---|---|---|---|
| AUTHENTICATED USER (NURSING STAFF) | GOOD | | REGISTRANT IS CONTACTABLE | NAME/IMAGE OUTPUT |
| AUTHENTICATED USER (NURSING STAFF) | POOR | | REGISTRANT IS NOT CONTACTABLE | NAME, NAME OF ASSIGNED NURSING STAFF/IMAGE OUTPUT |
| GUEST USER (RESIDENT) | | INSIDE 3 M RADIUS | REGISTRANT'S ASSIGNED NURSING STAFF IS NEARBY | NAME, NAME OF ASSIGNED NURSING STAFF, FACE PHOTO OF ASSIGNED NURSING STAFF/IMAGE OUTPUT |
| GUEST USER (RESIDENT) | | OUTSIDE 3 M RADIUS | REGISTRANT'S ASSIGNED NURSING STAFF IS NOT NEARBY | NAME/IMAGE OUTPUT |

FIG. 21

| AFFILIATED HOSPITAL | ATTENDANCE STATUS | BUSY STATUS | CURRENT STATUS INFORMATION | CONTACT INFORMATION/ PROVISION METHOD |
|---|---|---|---|---|
| SAME HOSPITAL | IN ATTENDANCE | BUSY/TREATING EMERGENCY | SAME HOSPITAL/ IN ATTENDANCE/BUSY | NAME, MEDICAL DEPARTMENT, EMAIL ADDRESS/EMAIL TRANSMISSION |
| SAME HOSPITAL | IN ATTENDANCE | NOT BUSY/NOT TREATING EMERGENCY | SAME HOSPITAL/ IN ATTENDANCE/NOT BUSY | NAME, MEDICAL DEPARTMENT, EXTENSION NUMBER/IMAGE OUTPUT |
| SAME HOSPITAL | NOT IN ATTENDANCE | | SAME HOSPITAL/DAY OFF | NAME, MEDICAL DEPARTMENT, EMAIL ADDRESS/EMAIL TRANSMISSION |
| OTHER HOSPITAL | | | OTHER HOSPITAL | NAME, HOSPITAL NAME, MEDICAL DEPARTMENT, PHONE NUMBER (MAIN)/ IMAGE OUTPUT |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-054460 filed Mar. 22, 2019.

BACKGROUND

(i) Technical Field

The present disclosure relates to an information processing apparatus, an information processing system, and a non-transitory computer readable medium.

(ii) Related Art

In places where multiple corporations or users not belonging to a corporation work, such as a shared office, it is not an uncommon case to consider trying to foster communication with other users for the purpose of creating new business opportunities through collaboration with other users or promoting the technology of one's company or one's own.

In such cases, to find and make contact with a user interested in information that oneself has or a user having information that oneself is seeking, there are methods such as posting information together with one's own contact address on a bulletin board or the like, or if the shared office is operating an SNS or the like, sharing information on the SNS. However, the former method entails giving out one's contact address to an unspecified large number of people including users who are uninterested, and therefore many feel reluctant to use such a method. Also, since the latter method incurs operating costs on the office side, the service is not provided in some cases.

Japanese Unexamined Patent Application Publication No. 2010-136332 describes providing information that a user may be interested in from information registered in a multi-function device or acquired externally by a multi-function device, on the basis of a user history created by analyzing job documents when the multi-function device is used. With this arrangement, information such as business ideas and job offers are provided together with the contact address of the registrant only to interested users, making contact possible.

SUMMARY

Meanwhile, in the case in which a certain user (hereinafter referred to as the "first user") desires to make contact with another user (hereinafter referred to as the "second user"), when reporting the second user's contact information to the first user, depending on the location where the second user is present, the first user may have difficulty making contact with the second user with the reported contact information in some cases.

Aspects of non-limiting embodiments of the present disclosure relate to a technology that makes it easier for the first user to make contact with the second user compared to the case of not updating the contact information of the second user reported to the first user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquisition unit that acquires position information about a position of a second user, and a reporting unit that, in a case of a first user making contact with the second user, when reporting contact information that is information uniquely specifying the second user, alters the contact information according to the position information and reports the altered contact information to the first user.

BRIEF DESCRIPTION OF THE DRAWINGS

An exemplary embodiment of the present disclosure will be described in detail based on the following figures, wherein:

FIG. 6 is a diagram explaining an alteration table according to the exemplary embodiment;

FIG. 7 is a process flowchart of a second user-side image forming apparatus according to the exemplary embodiment;

FIG. 11 is a diagram explaining another alteration table according to the exemplary embodiment;

FIG. 12 is a process flowchart of another second user-side image forming apparatus according to the exemplary embodiment;

FIG. 14 is a diagram explaining display apparatus output according to the exemplary embodiment;

FIG. 15 is a diagram explaining yet another alteration table according to the exemplary embodiment;

FIG. 16 is a diagram explaining yet another alteration table according to the exemplary embodiment;

FIG. 17 is a diagram explaining another display apparatus output according to the exemplary embodiment;

FIG. 18 is a diagram explaining yet another alteration table according to the exemplary embodiment;

FIG. 19 is a diagram explaining yet another alteration table according to the exemplary embodiment;

FIG. 21 is a diagram explaining yet another alteration table according to the exemplary embodiment;

DETAILED DESCRIPTION

Hereinafter, the exemplary embodiment of the present disclosure will be described on the basis of the drawings.

Figure 1:
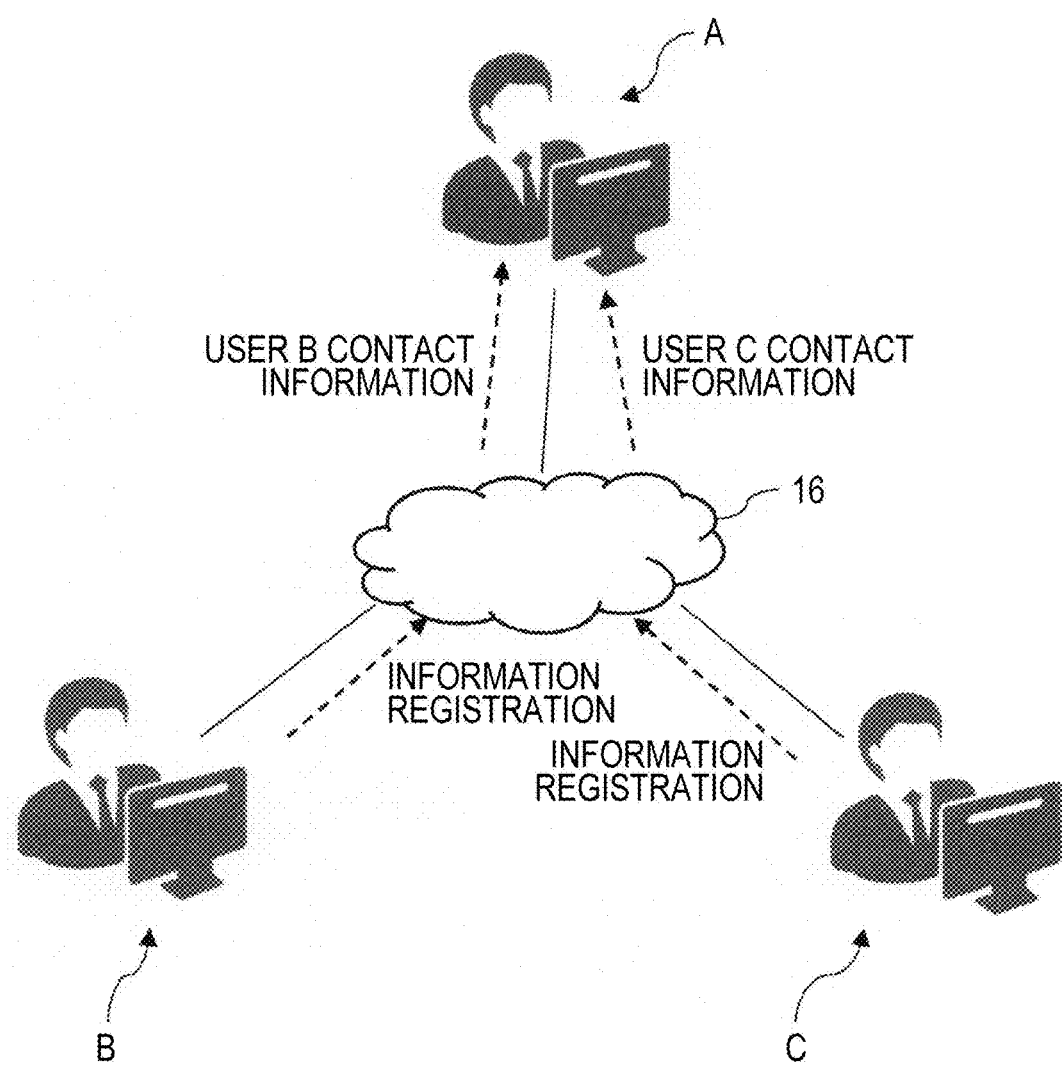
FIG. 1 is a conceptual diagram of the exemplary embodiment (1 of 3)

FIG. 1 illustrates a basic conceptual configuration of the exemplary embodiment. Multiple users, such as User A, User B, and User C for example, are connected to a cloud server 16 through respective user terminals, transmitting and receiving data with each other.

User A operates his or her user terminal to upload specific information to the cloud server 16, thereby registering the information in the cloud server 16. Similarly, User B and User C operate each of their own user terminals to upload specific information to the cloud server 16, thereby registering the information in the cloud server 16.

At this point, if User A registers information in the cloud server 16, on the cloud server 16, the information registered by User A is cross-referenced with information already registered, and in the case of determining that both are related, user information about the user who registered the related information is reported to User A. This is based on the presumption that, in the case in which two pieces of information are related to each other, at least one of the users of these two pieces of information will be interested in the other, and want to make contact.

For example, in the case in which information registered by User A and information registered by User B are related to each other, the cloud server 16 reports contact information for contacting User B to User A. Similarly, in the case in which information registered by User A and information registered by User C are related to each other, the cloud server 16 reports contact information for contacting User C to User A.

Herein, contact information refers to information that uniquely specifies a related user in the case of making contact with the related user. For example, in the case of making face-to-face contact with the related user, a photo of the related user's face and seat information is included in the information that uniquely specifies the related user. Specifically, it is anticipated that information such as a phone number or an email address will be reported via established media, such as on paper, in an email, or by being displayed on a screen, but if the contact information to report is static or indiscriminate regardless of the location where the related user is present, difficulties may occur in some cases. Specifically, in the case of reporting the contact information for User B to User A, if User B is present near User A, it is more favorable to output image information enabling User B to be identified, such as a photo of User B's face or whole body, or a design that reminds one of User B, and a graphic representation of User B's position and the like on paper rather than reporting User B's phone number or the like in an email. On the other hand, if User B is present at a location far away from User A, it is more favorable to report User B's phone number, email address, or the like in an email. The name of the user may also be reported in addition to the above information. Also, even if User B is present near User A, in the case in which User B is present in a security area or a location where a face-to-face meeting is difficult, a reporting method that presupposes a direct meeting is not necessarily preferable.

Accordingly, in the case of reporting User B's contact information to User A for example, the cloud server 16 adaptively alters the contact information according to position information about User B, and causes the altered contact information to be reported. Similarly, in the case of reporting User C's contact information to User A, the cloud server 16 adaptively alters the contact information according to position information about User C, and causes the altered contact information to be reported.

Figure 2:
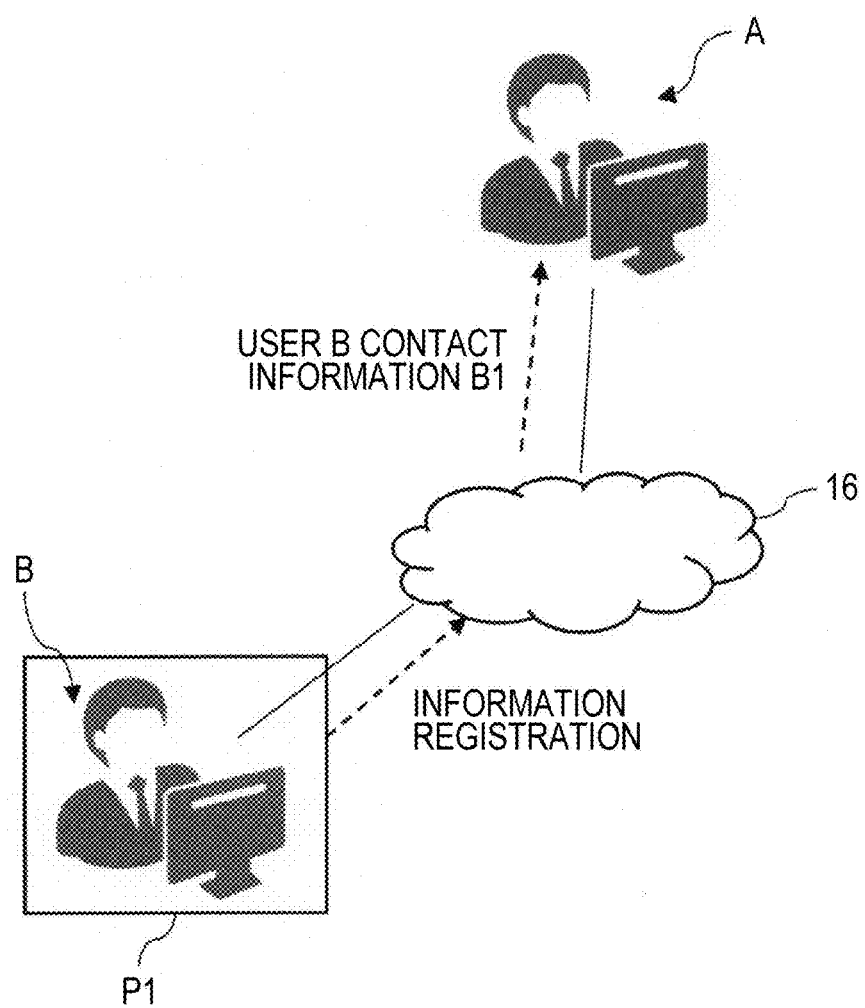
FIG. 2 is a conceptual diagram of the exemplary embodiment (2 of 3)
Figure 3:
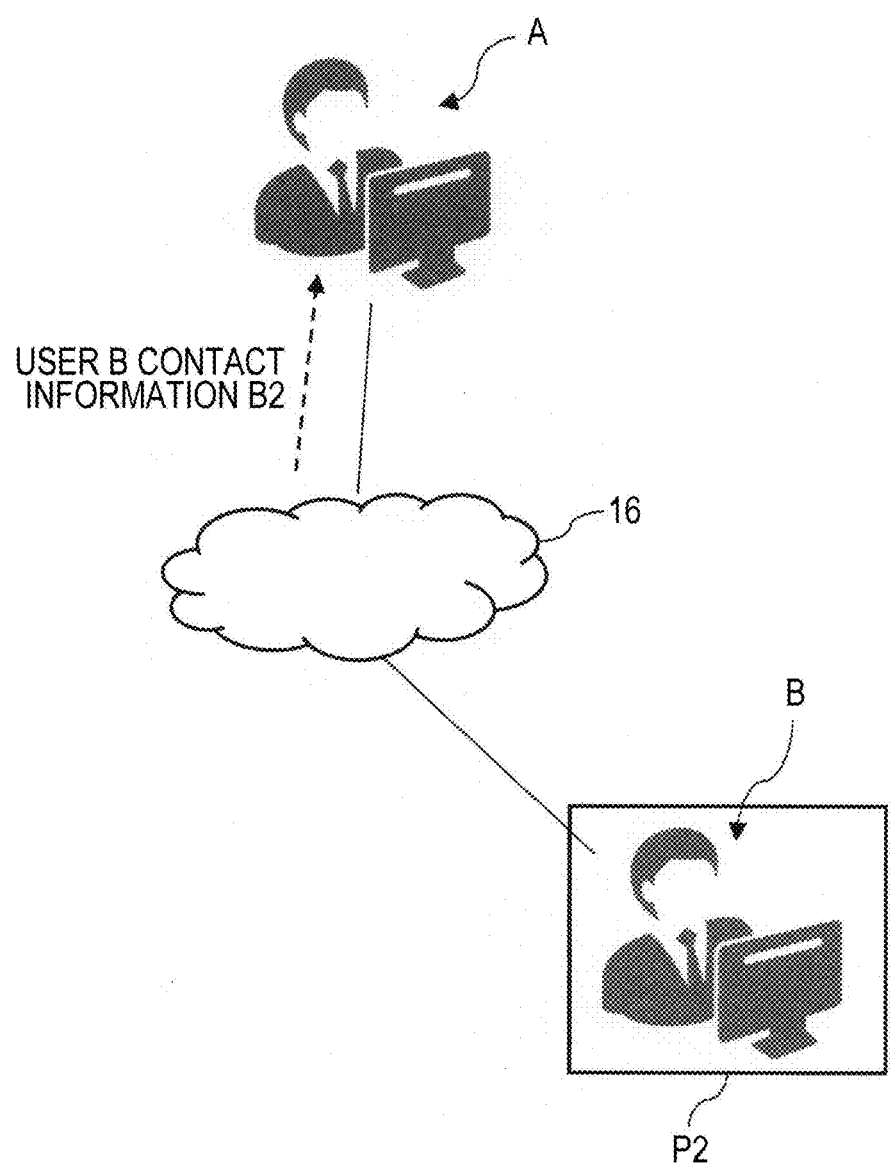
FIG. 3 is a conceptual diagram of the exemplary embodiment (3 of 3)

FIGS. 2 and 3 schematically illustrate how contact information for User B treated as the second user who is a related user is reported to User A treated as the first user.

In FIG. 2, User B about whom information is registered in the cloud server 16 is taken to be present at a position P1, and the cloud server 16 acquires the position P1 of User B by detecting the position of the user terminal operated by User B, for example. If User A newly registers information or the like and accesses the cloud server 16, the cloud server 16 determines whether or not the information of User A is related to the registered information of User B, and if the information is related, the cloud server 16 decides to report the contact information for User B to User A. Subsequently, after altering the contact information B for User B according to the position P1 of User B, the cloud server 16 reports the altered contact information B1 to User A.

Also, in FIG. 3, User B about whom information is registered in the cloud server 16 is taken to be present at a position P2, and the cloud server 16 acquires the position P2 of User B by detecting the position of the user terminal operated by User B, for example. If User A newly registers information or the like and accesses the cloud server 16, the cloud server 16 determines whether or not the information of User A is related to the registered information of User B, and if the information is related, the cloud server 16 decides to report the contact information for User B to User A. Subsequently, after altering the contact information B for User B according to the position P2 of User B, the cloud server 16 reports the altered contact information B2 to User A. The contact information B of User B is standard or reference contact information, while the contact information B1 and B2 is contact information obtained by altering the standard or reference contact information according to position information about User B. For the method of altering information, a specific function may be used, or a specific alteration table may be used. Provided that f is an alteration function, the relation $$\text{Altered contact information} = f(\text{position information, unaltered contact information})$$

holds, where the unaltered contact information is the standard or reference contact information.

An "alteration" in the exemplary embodiment may include at least one of an alteration of the content of the contact information and an alteration of the output format. An alteration of the content of the contact information includes choosing which information may function as the contact information, such as a name, age, gender, place of residence, face photo, email address, department, official position, and place of employment, for example. Also, an alteration of the output format includes choosing among outputting to a paper medium, transmitting an email, transmitting a fax, transmitting an electronic message, displaying information on a display apparatus, and the like.

Hereinafter, processes according to the exemplary embodiment will be described more specifically.

Figure 4:
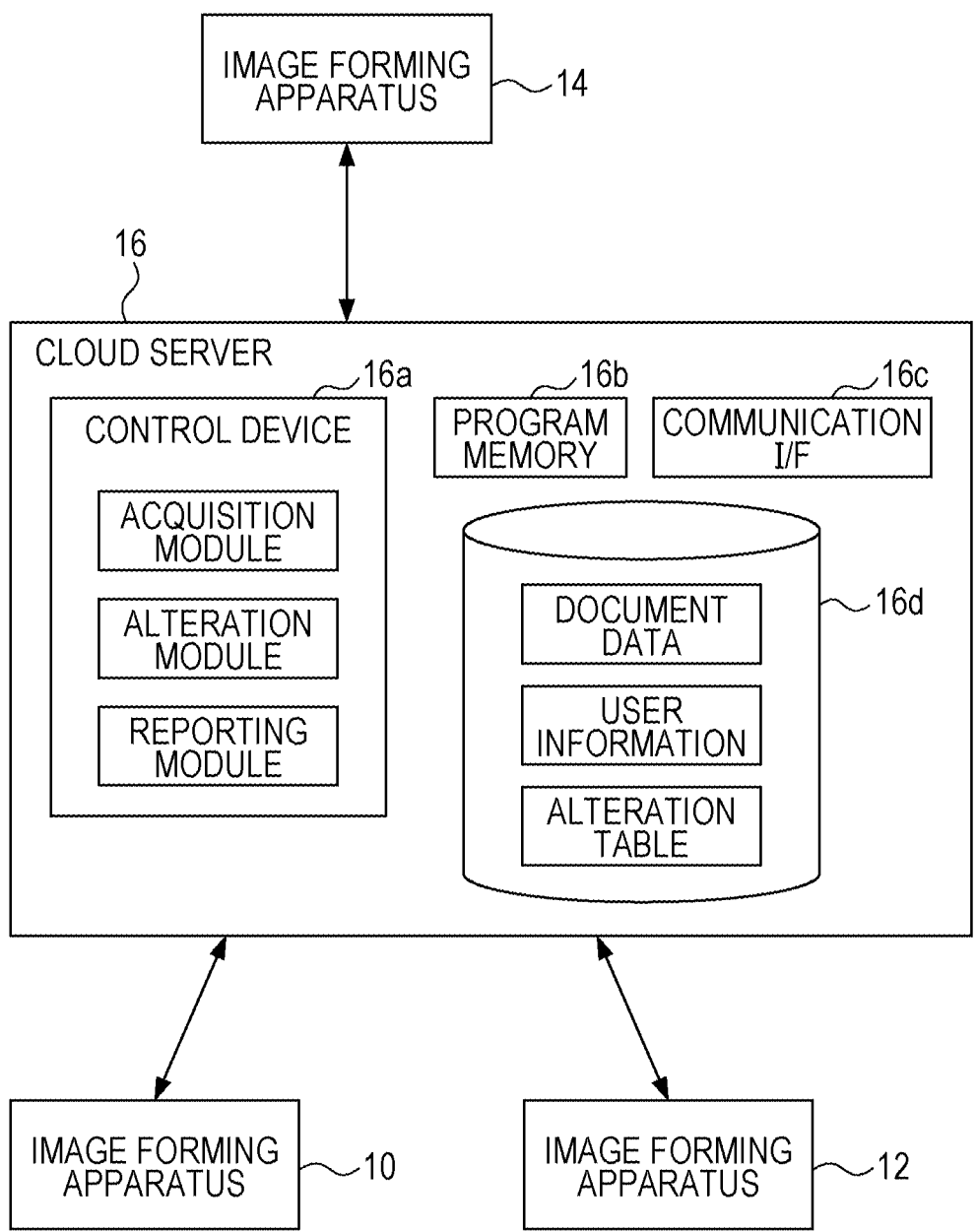
FIG. 4 is an overall configuration diagram of the exemplary embodiment.

FIG. 4 illustrates a system configuration in which multiple image forming apparatus installed in an office, a store, or the like are connected to the cloud server 16.

Image forming apparatus 10, 12, and 14 are installed in the same shared office for example, and are connected to the cloud server 16 through a communication network such as a corporate LAN or the Internet. The image forming apparatus 10, 12, and 14 are multi-function devices provided with multiple functions such as scan, copy, print, and fax functions, for example. A user scans a document using any of the image forming apparatus 10, 12, and 14, and uploads document data to the cloud server 16. When uploading, keywords included in the document data are extracted and uploaded together with an ID that specifies the user. The document is not limited to one using letters and symbols, and may also contain diagrams and photos.

the cloud server 16 is provided with a control device 16a, program memory 16b such as ROM, a communication interface (I/F) 16c, and a storage device 16d.

The storage device 16d stores document data and extracted keywords uploaded from the image forming apparatus 10, 12, and 14, and user information. The user information includes information about registered users having rights to use the system, such as the name of each user, image information such as a face photo, an email address, a place of employment, and a seat position inside an office.

The control device 16a includes one or multiple processors, and achieves each process by reading out and executing a processing program stored in the program memory 16b. Part of the functions of the control device 16a may also be achieved by hardware processing rather than by software processing through the execution of a program. Hardware processing may be performed using a circuit such as an ASIC or a field-programmable gate array (FPGA), for example. To execute each process, the control device 16a is provided with an acquisition module, an alteration module, and a reporting module as function modules. Herein, "modules" mean components of software or hardware that are logically separable. The modules may correspond to functions in a 1:1 manner, but a single module may be realized by a single program, or multiple modules may be realized by a single program. Also, multiple modules may be executed by a single processor, or may be executed by multiple processors in a distributed or parallel environment. In the process by each module, information to be processed is read in, and after the process is performed by a processor such as a CPU, a process result is output.

The acquisition module acquires position information about the position of a user in the shared office. The position information may be acquired from position information of a portable terminal carried by the user or from position information of an image forming apparatus operated by the user.

The alteration module cross-references the keywords of document data newly registered from one of the image forming apparatus 10, 12, and 14 with the keywords of document data already stored in the storage device 16d, and by determining whether or not both sets of keywords match, determines whether or not document data related to the newly registered document data exists. Also, in the case in which document data related to the newly registered document data exists, with respect to the first user associated with the newly registered document data, the alteration module alters the contact information of the second user associated with the related document data according to the position information of the second user acquired by the acquisition module The alteration module references an alteration table stored in the storage device 16d, and alters the contact information of the second user according to the position information of the second user in accordance with the alteration table. For example, if the second user uploads and registers second document data in the storage device 16d of the cloud server 16 from the image forming apparatus 14, and later, the first user uploads first document data related to the second document data from the image forming apparatus 10, the alteration module determines that the first document data and the second document data are related, reads out the contact information of the second user stored in the storage device 16d as the user information, and alters the contact information of the second user according to the position information of the second user acquired by the acquisition module.

The reporting module reports the contact information of the second user altered by the alteration module to the first user through the communication I/F 16c.

Figure 5A:
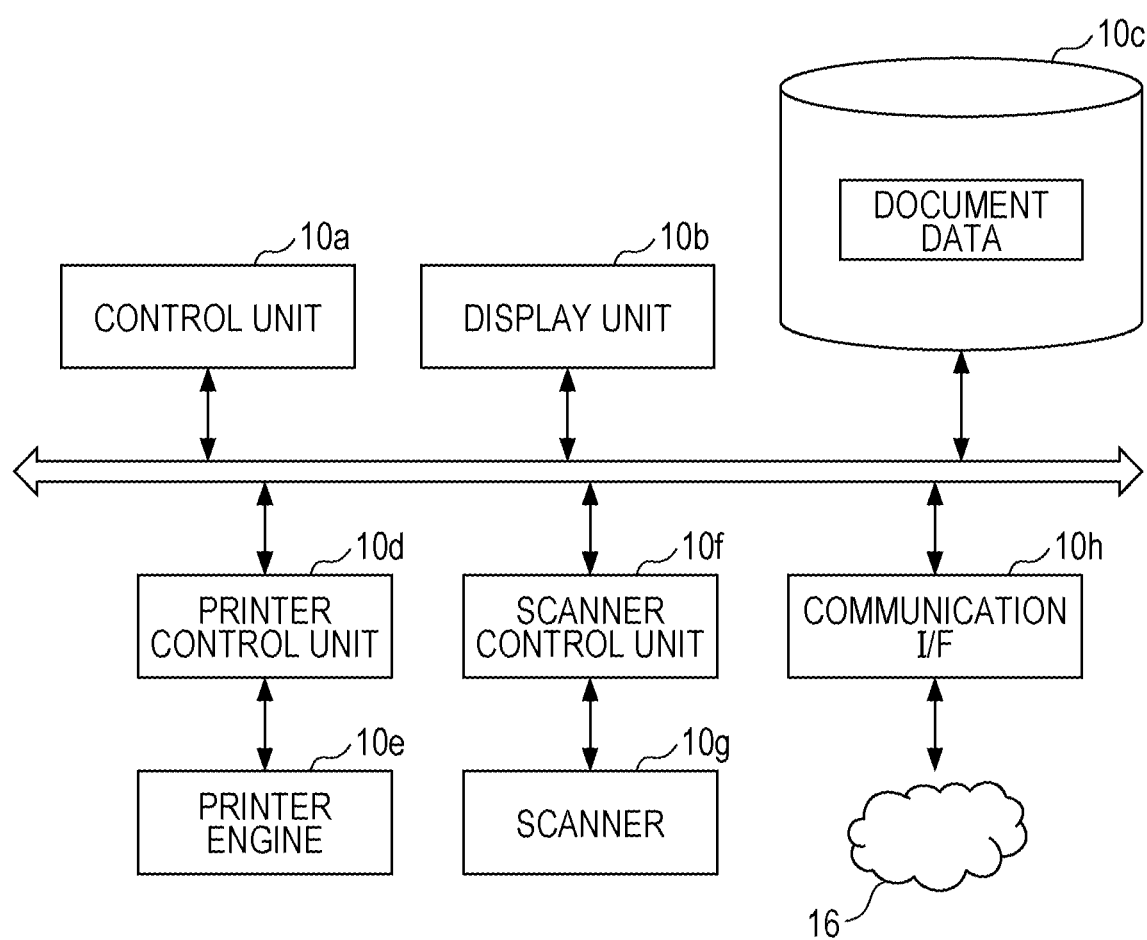
FIG. 5A is a configuration diagram of an image forming apparatus according to the exemplary embodiment.

FIG. 5A illustrates a configuration block diagram of the image forming apparatus 10. The image forming apparatus 12 and 14 are also similar.

The image forming apparatus 10 is provided with a control unit 10a, a display unit 10b, a storage unit 10c, a printer control unit 10d, a printer engine 10e, a scanner control unit 10f, a scanner 10g, and a communication I/F 10h.

The control unit 10a controls the operations of the apparatus as a whole. The control unit 10a includes one or multiple processors, and controls each process, that is, each process of scanning, printing, copying, and faxing a document according to user operations, by reading out and executing a processing program stored in program memory such as ROM. The control unit 10a scans and converts a document into document data according to a user operation, and additionally extracts keywords from the document data. Also, the control unit 10a acquires a user ID of the user performing the operation. If user authentication is demanded when performing the operation, the authentication information may be used as the user ID. The control unit 10a uploads the document data, the keywords, and the user ID to the cloud server 16 through the communication I/F 10h. Also, the control unit 10a uploads an operation history of the user stored in the storage unit 10c to the cloud server 16. Additionally, in the case in which the contact information of a user is transmitted from the cloud server 16, the control unit 10a receives the contact information through the communication I/F 10h, and outputs the received contact information in an output format designated by the cloud server 16. The output formats are image output from the printer and display output from the display unit 10b The display unit 10b includes a liquid crystal display or the like, and receives user operations while also reporting contact information to the first user by displaying the contact information in accordance with an instruction from the control unit 10a.

The communication I/F 10h controls communication with the cloud server 16.

The storage unit 10c stores document data obtained by scanning with the scanner 10g. Also, the storage unit 10c stores the keywords of document data extracted by the control unit 10a in association with the document data. Additionally, the storage unit 10c stores an operation history of the user, and stores the dates and times of using the image forming apparatus in association with the user.

The printer control unit 10*d* drives the printer engine 10*e* according to a user operation received by the display unit 10*b* to output an image. In particular, the printer control unit 10*d* reports contact information received from the cloud server 16 to the first user by printing out an image of the contact information according to an instruction from the control unit 10*a*.

The scanner control unit 10*f* drives the scanner 10*g* according to a user operation received by the display unit 10*b* to execute a scan process.

FIG. 6 illustrates one example of the alteration table stored in the storage device 16*d* of the cloud server 16.

The alteration table is a table that stipulates the email address of the second user, the day on which the second user last used the image forming apparatus, the position information of the second user, and the contact information to report to the first user as well as the method of providing the contact information (output format) in association with each other.

If the second user is a registered user of the system, the email address is the registered email address. If the second user is an unregistered user of the system, a registered email address does not exist.

"Last used" is an operation history of the image forming apparatus by the second user, and is classified into one of "Today", "Less than a week ago", and "More than a week ago". "Today" means the day on which the alteration module of the control device 16*a* alters the contact information is the same day as the day on which the reporting module reports the altered contact information.

The position information is the position information of the second user, and is estimated from the operation history of the second user. In other words, if "Last used" is "Today", the second user is estimated to be present inside the same office as the first user, and additionally, the probability is estimated to be relatively high. If "Last used" is "Less than a week ago", the second user is estimated to be present inside the same office as the first user, and additionally, the probability is estimated to be relatively moderate. In the case in which "Last used" is "More than a week ago", the second user is estimated to be present inside the same office as the first user, but the probability is estimated to be relatively low. This is because all of the image forming apparatus 10, 12, and 14 are installed inside the same shared office, and in the case in which the second user has used any of the image forming apparatus, the probability that the second user is still currently present inside the office may be rated higher the closer "Last used" is to the present time. Note that if the second user is an unregistered user, the second user is estimated to be present inside the same office as the first user regardless of "Last used", but the probability is estimated to be relatively low.

The contact information/provision method is set according to the position information. In other words, if there is a relatively "High" probability of the position information being inside the same office, seat information and a face photo of the second user are selected as the content of the contact information, and image output is also selected as the output format. If there is a relatively "Medium" probability of the position information being inside the same office, seat information and a face photo of the second user are selected as the content of the contact information, and image output is also selected as the output format. If there is a relatively "Low" probability of the position information being inside the same office, the email address of the second user is selected as the content of the contact information, and email transmission is also selected as the output format.

The alteration module alters the contact information of the second user in accordance with the alteration table illustrated in FIG. 6, and supplies the altered contact information to the reporting module. The reporting module reports the altered contact information to the image forming apparatus 10. The altered contact information includes the content and the output format of the contact information. The control unit 10*a* of the image forming apparatus 10 controls the printer control unit 10*d* or the display unit 10*b* in accordance with the altered contact information from the cloud server 16, and reports the altered contact information to the first user by image output or display output. In the case in which seat information and a face photo of the second user are selected as the content of the contact information and image output is also selected as the output format, the control unit 10*a* of the image forming apparatus 10 controls the printer control unit 10*d* to print out an image of the seat information and the face photo of the second user. Also, in the case in which the email address of the second user is selected as the content of the contact information and email transmission is also selected as the output format, the control unit 10*a* transmits an email to the portable terminal of the first user through the communication I/F 10*h*.

Note that in the case in which the output format is email transmission, the reporting module may also transmit an email to the portable terminal of the first user rather than the image forming apparatus 10.

Also, in the alteration table of FIG. 6, "Last used" may be classified more finely, and additionally, the probability of the position information may be quantified more finely. Generally, the probability of being inside the same office may be rated higher the closer "Last used" is to the present time, while the probability may be rated lower the farther "Last used" is in the past. Also, using image output for a higher probability that the second user is inside the same office is because, in the case in which it is highly possible for the first user to meet the second user directly face-to-face, it is thought that printing out and carrying the contact address on a piece of paper would make it easier to find the second user, whereas if there is a low probability of the second user being inside the same office, it is thought that since it would be difficult for the first user to meet the second user directly face-to-face, making contact by email would be easier.

Also, in the alteration table in FIG. 6, the seat information and face photo of the second user are selected in the cases of "High" and "Medium" probability of being inside the same office, but the name and department of the second user additionally may be selected besides the above. Furthermore, if schedule data exists for the second user, information about whether or not the second user is currently out of the office may also be added on the basis of the schedule data. The content of the contact information may be selected according to the output format.

In FIGS. 1 to 6, the control device 16*a* in the cloud server 16 is provided with the acquisition module, the alteration module, and the reporting module, and the cloud server 16 is configured to alter and report the contact information to the first user according to the position information of the second user, but at least part of the functions of the cloud server 16 may also be realized by the image forming apparatus 10, 12, and 14.

Figure 5B:
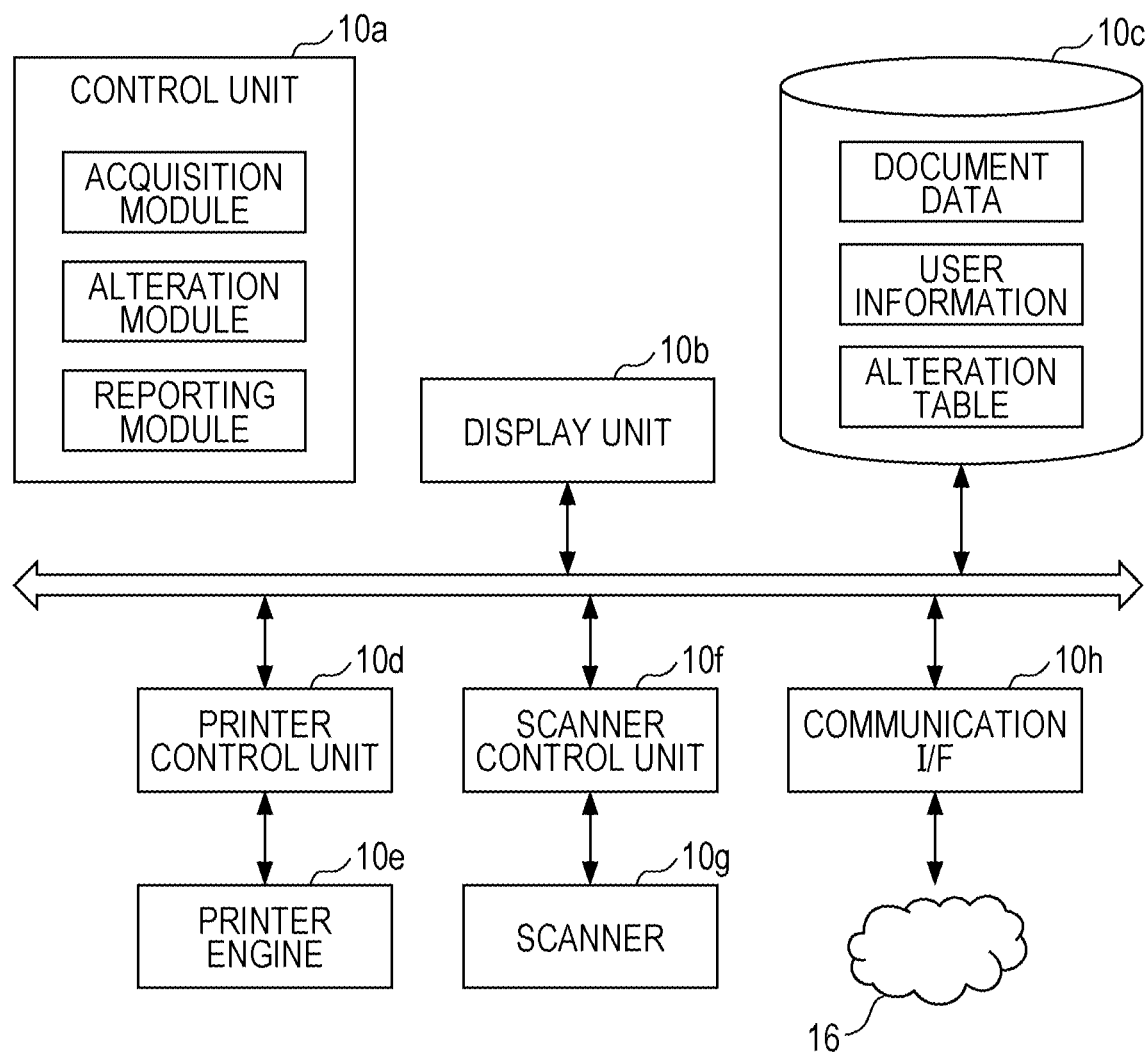
FIG. 5B is a configuration diagram of another image forming apparatus according to the exemplary embodiment.

FIG. 5B illustrates a configuration block diagram of the image forming apparatus 10 in this case. The control unit 10*a* of the image forming apparatus 10 is provided with the acquisition module, the alteration module, and the reporting module, while document data, user information, and the alteration table are stored in the storage unit 10*c*. The acquisition module of the control unit 10a receives and acquires the position information of the second user transmitted from the cloud server 16. The alteration module alters the contact information of the second user in accordance with the alteration table stored in the storage unit 10c, and controls the printer control unit 10d or the display unit 10b to report the altered contact information to the first user. The alteration module provided in the control device 16a of the cloud server 16 executes the keyword cross-referencing process, but the alteration module provided in the control unit 10a of the image forming apparatus 10 does not have to execute the keyword cross-referencing process, and instead may receive the result of keyword cross-referencing executed by the cloud server 16, and use the cross-referencing result to execute the alteration process.

In the case in which the acquisition module, the alteration module, and the reporting module are implemented in the cloud server 16, the cloud server 16 may function as an information processing apparatus, whereas in the case in which the acquisition module, the alteration module, and the reporting module are implemented in the image forming apparatus 10, 12, and 14, the image forming apparatus 10, 12, and 14 may function as an information processing apparatus. Obviously, the acquisition process, the alteration process, and the reporting process may also be executed in a distributed manner by the cloud server 16 and the image forming apparatus 10, 12, and 14.

Regardless of whether the cloud server 16 or the image forming apparatus 10, 12, and 14 function as the information processing apparatus, having the second user use one of the image forming apparatus 10, 12, and 14 to register document data in the cloud server 16 is beneficial for the following reasons. Namely, registration is easy in cases where the document is a paper medium. Also, since the image forming apparatus 10, 12, and 14 automatically register document data in the cloud server 16, the second user is not required to input information every time. Furthermore, since the second user registers document data by operations on the image forming apparatus 10, 12, and 14 (including operations from a user terminal connected to the same communication network), the second user is basically registered in the system and the document data is clearly information originating from the user, and a certain amount of credibility may be secured. However, as illustrated in FIG. 6, the second user according to the exemplary embodiment is not necessarily limited to being a user registered in the system.

Hereinafter, processes according to the exemplary embodiment will be described in further detail by taking as an example the case in which the image forming apparatus 10, 12, and 14 are provided with the acquisition module, the alteration module, and the reporting module, the first user operates the image forming apparatus 10, and the second user operates the image forming apparatus 14.

FIG. 7 illustrates a process flowchart of the image forming apparatus 14 operated by the second user.

If the control unit of the image forming apparatus 14 authenticates the second user through the input of an ID and password by a touch panel operation, facial authentication with a camera, biometric authentication, or the like (S101), the control unit receives an operation by the second user, scans and converts a document into document data, and registers the document data in the storage unit (S102). Also, the control unit analyzes the document data to extract keywords (S103), and transmits the document data, the keywords, and the email address of the second user as a set to the cloud server 16 (S104).

Also, the control unit transmits a usage history of the second user, or in other words the dates and times when the second user has used the image forming apparatus 14, to the cloud server 16.

For the extraction of the keywords from the document data, a known extraction method may be used. For example, semantic tags may be attached to named entities in the document, and the elements of the semantic tags specified from the tagged document may be extracted as keywords. Also, if the second user is a registered user, the email address of the second user is stored in advance as user information in the storage unit, and control unit reads out and transmits the email address of the second user specified by user authentication to the cloud server 16. Note that if the second user is an unregistered user, an indication that the second user is unregistered is transmitted, and an email address is not transmitted.

Figure 8:
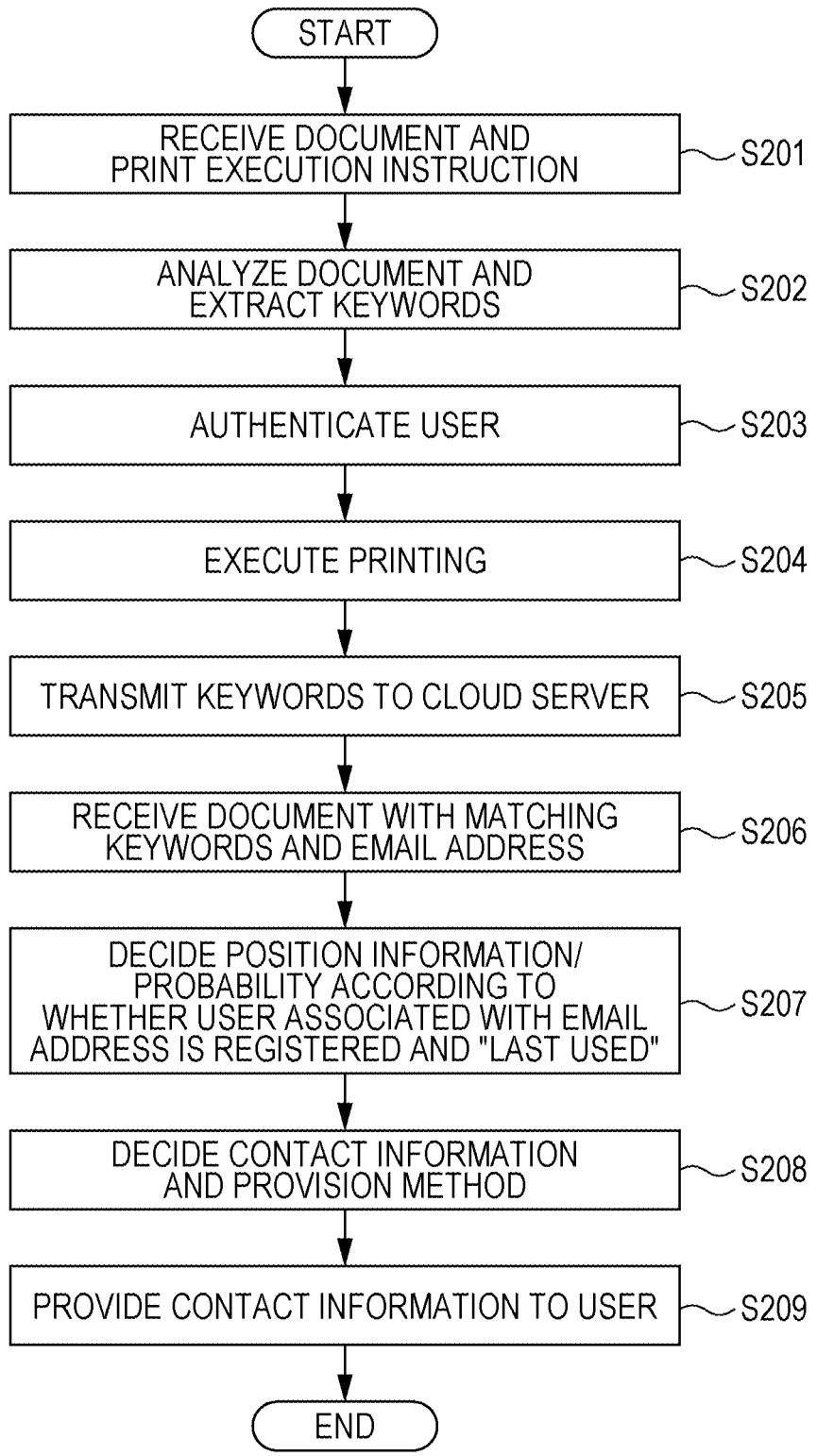
FIG. 8 is a process flowchart of a first user-side image forming apparatus according to the exemplary embodiment.

FIG. 8 illustrates a process flowchart of the image forming apparatus 10 operated by the first user.

If the control unit 10a of the image forming apparatus 10 receives a document and a print execution instruction according to an operation by the first user (S201), the control unit 10a converts the document into document data and extracts keywords (S202). Also, the control unit 10a performs user authentication of the first user (S203), and if authentication is successful, executes the printing of the document according to the operation by the first user (S204). At this point, the document may be transmitted from a device such as a personal computer (PC) of the first user, or may be supplied from a document feeder as an original copy of the document.

When printing is executed, the control unit 10a transmits the keywords extracted in S202 to the cloud server 16 (S205). At this point, it should be noted that the first user has simply instructed the image forming apparatus 10 to execute a job of printing the document, and the control unit 10a transmits keywords of the document associated with the first user to the cloud server 16 automatically, without receiving any special instructions such as the first user inputting document keywords to use for search or performing an operation of requesting cross-referencing from the data of the document.

The control device 16a of the cloud server 16 cross-references the keywords transmitted from the image forming apparatus 10 with the keywords transmitted from the image forming apparatus 14, and in the case in which both sets of keywords match, the control device 16a treats the document associated with the first user and document that the second user transmitted from the image forming apparatus 14 as being related to each other, and transmits the document data of the second user with matching keywords and the email address of the second user to the image forming apparatus 10.

If the document data and the email address are received from the cloud server 16 (S206), the control unit 10a decides the position information and the probability according to whether or not the second user associated with the email address is registered and also according to "Last used", that is, the last day that the second user used the image forming apparatus 14 (S207). This decision is executed by referencing the alteration table stored in the storage unit 10c. Furthermore, the control unit 10a decides the contact information of the second user and the provision method (output format) according to the decided position information of the second user and the probability (S207). This decision is likewise executed by referencing the alteration table stored in the storage unit 10c. The control unit 10a reports and provides the contact information of the second user to the first user, in accordance with the decided contact information and provision method (S209). In other words, if the provision method (output format) is image output, the control unit 10a controls the printer control unit 10d to print out the contact information onto paper. If the provision method is email transmission, the control unit 10a transmits the contact information to the portable terminal of the first user through the communication I/F 10h. The email address of the first user may be acquired from the user information stored in the storage unit 10c. If the provision method is display output, the control unit 10a controls the display unit 10b to display the contact information.

Figure 9:
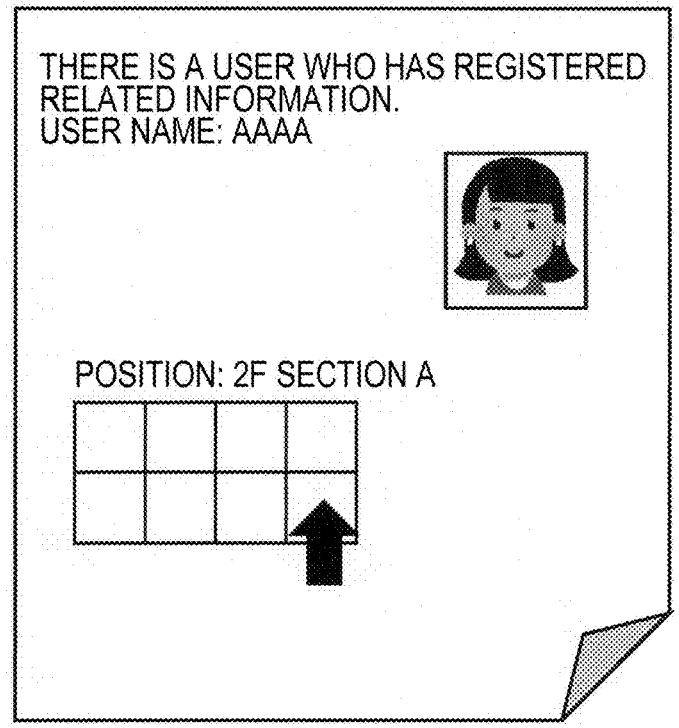
FIG. 9 is a diagram explaining image output according to the exemplary embodiment.

FIG. 9 illustrates one example of the case of image output of the contact information of the second user. In this case, there is a relatively high probability of the second user being present inside the same office. The message "There is a user who has registered related information." along with the name of the second user, a face photo, and seat information inside the office are printed onto a piece of paper and output. The first user may carry the piece of paper while referring to the face photo and the seat information printed on the piece of paper to meet the second user face-to-face and make contact.

Note that, as illustrated in the process of S206 in FIG. 8, since the control unit 10a of the image forming apparatus 10 receives the document data of the second user from the cloud server 16 and stores the received document data in the storage unit 10c, the control unit 10a may not only output an image of the contact information of the second user, but also the document data of the second user as related information obtained by cross-referencing. In the case of such image output, the images may be output onto the same page, or the contact information may be appended or prepended to the document data. With this arrangement, the first user may also grasp the content of the related information as well as the contact information of the second user.

Figure 10:
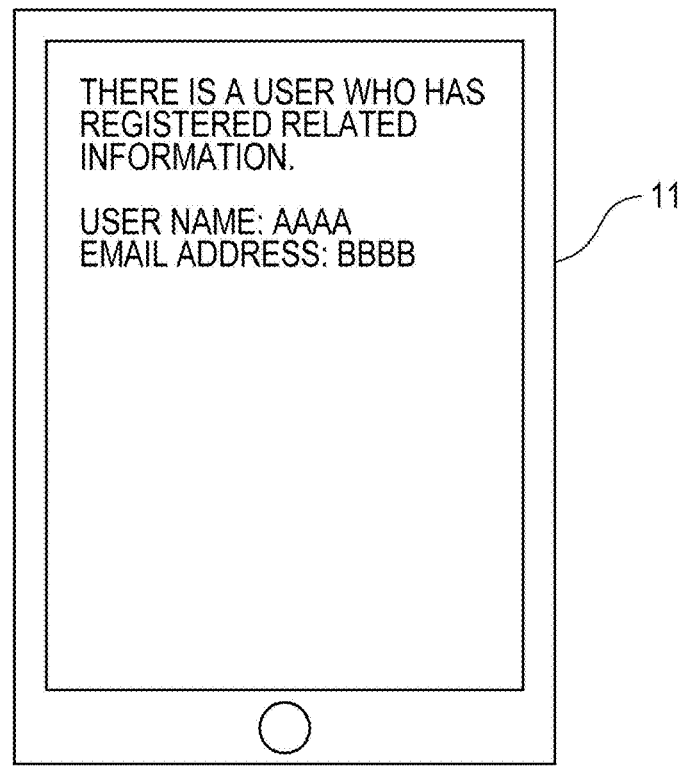
FIG. 10 is a diagram explaining portable terminal output according to the exemplary embodiment.

FIG. 10 illustrates one example of the case of email transmission of the contact information of the second user. In this case, there is a relatively low probability of the second user being present inside the same office. The message "There is a user who has registered related information." along with the name and the email address of the second user are output. The first user may use the email address as appropriate to make contact with the second user.

Likewise in this case, as illustrated in the process of S206 in FIG. 8, since the control unit 10a of the image forming apparatus 10 receives the document data of the second user from the cloud server 16 and stores the received document data in the storage unit 10c, the control unit 10a may not only output the contact information of the second user, but also the document data of the second user as related information obtained by cross-referencing. The document data at this point may be displayed as a thumbnail, or link data for accessing the document data may be output. A message such as "Click here to view the related information." is displayed, and a link is set in the "here" portion. With this arrangement, the first user may also grasp the content of the related information as well as the contact information of the second user.

FIG. 11 illustrates another example of the alteration table.

The alteration table is a table that stipulates a detection result, a distance to the portable terminal, position information, and the contact information and provision method (output format) in association with each other.

The detection result is a result of whether or not the portable terminal of the second user has been detected successfully by the image forming apparatus 14 or the cloud server 16, and is classified into whether or not the same ID as the preregistered ID of the portable terminal of the second user has been detected successfully.

In the case in which the same ID has been detected, the distance to the portable terminal is classified into whether or not the detected portable terminal and the first user are on the same floor.

The position information is position information estimated according to the distance to the portable terminal, and is classified into "On the same floor", "On another floor of the office", and "Outside the office". If the distance to the portable terminal is "On the same floor", the position information is also estimated to be "On the same floor", and if the distance to the portable terminal is "On another floor", the position information is also estimated to be "On another floor of the office". In the case in which the same ID is not detected successfully, the distance to the portable terminal is unknown, and the position information is estimated to be "Outside the office".

The contact information and provision method are set according to the position information. If the position information is "On the same floor", seat information and a face photo are selected as the content of the contact information, and display output is selected as the provision method (output format). If the position information is "On another floor of the office", the number of the detected floor and a face photo are selected as the content of the contact information, and image output is selected as the provision method (output format). If the position information is "Outside the office", the email address is selected as the content of the contact information, and email transmission is selected as the provision method (output format).

FIG. 12 illustrates another process flowchart of the image forming apparatus 14 operated by the second user.

If the control unit of the image forming apparatus 14 authenticates the second user through the input of an ID and password by a touch panel operation, facial authentication with a camera, biometric authentication, or the like (S301), the control unit receives an operation by the second user, scans and converts a document into document data, and registers the document data in the storage unit (S302). Also, the control unit analyzes the document data to extract keywords (S303), acquires the ID of the portable terminal of the second user (S304), and transmits the document data, the keywords, the email address of the second user, and the acquired ID of the portable terminal of the second user as a set to the cloud server 16 (S305). In the case in which the second user has used the ID of the portable terminal for user authentication, the ID used during authentication may be transmitted as-is to the cloud server 16. The image forming apparatus 14 may also use Bluetooth Low Energy (BLE) to detect the ID of the portable terminal.

Figure 13:
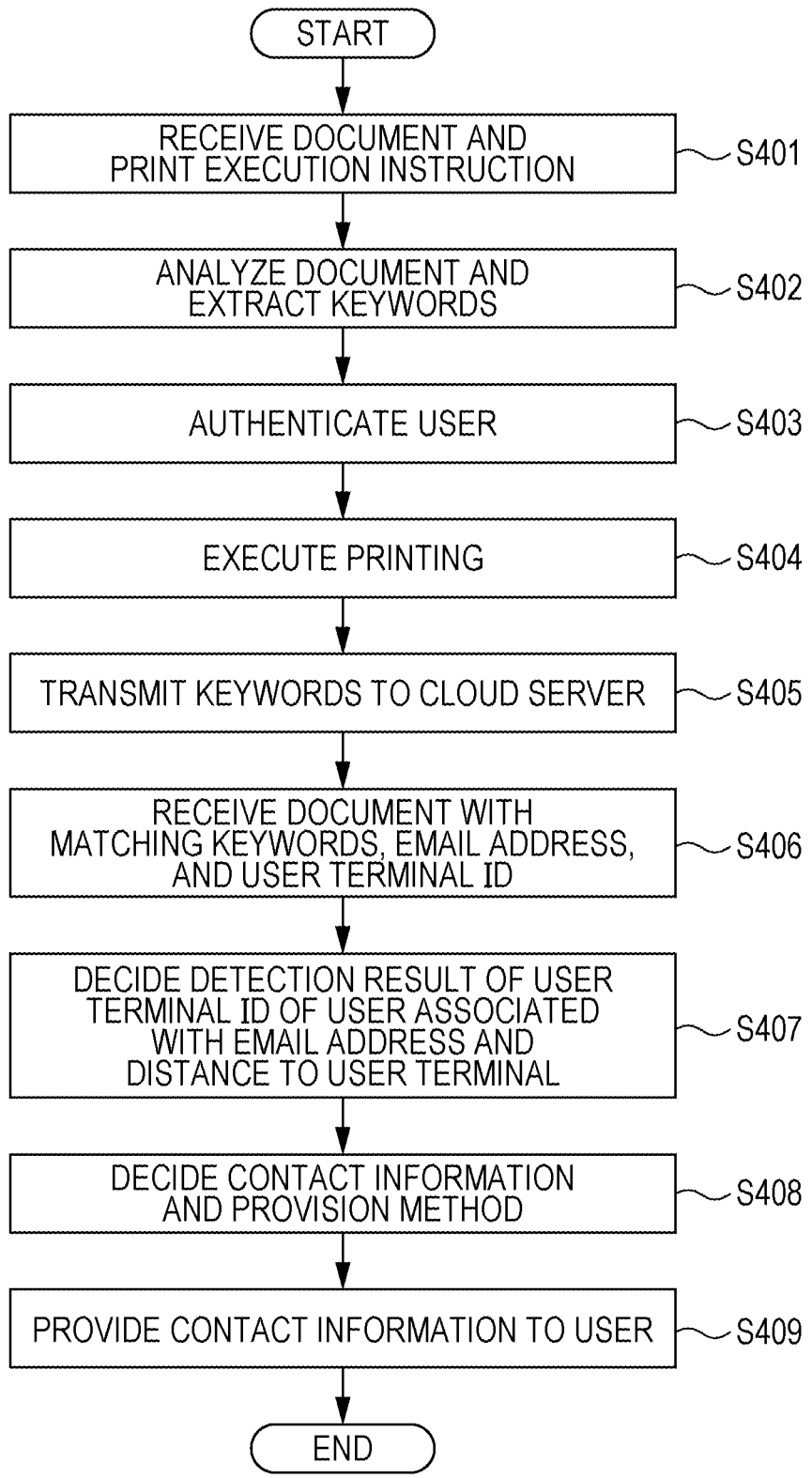
FIG. 13 is a process flowchart of another first user-side image forming apparatus according to the exemplary embodiment.

FIG. 13 illustrates a process flowchart of the image forming apparatus 10 operated by the first user.

If the control unit 10a of the image forming apparatus 10 receives a document and a print instruction according to an operation by the first user (S401), the control unit 10a converts the document into document data and extracts keywords (S402). Also, the control unit 10a performs user authentication of the first user (S403), and if authentication is successful, executes the printing of the document according to the operation by the first user (S404).

When printing is executed, the control unit 10a transmits the keywords extracted in S402 to the cloud server 16 (S405).

The control device 16a of the cloud server 16 cross-references the keywords transmitted from the image forming apparatus 10 with the keywords transmitted from the image forming apparatus 14, and in the case in which both sets of keywords match, the control device 16a treats the document associated with the first user and document that the second user transmitted from the image forming apparatus 14 as being related to each other, and transmits the document data of the second user with matching keywords, the email address of the second user, and the ID of the portable terminal of the second user to the image forming apparatus 10.

If the document data, the email address, and the ID of the portable terminal are received from the cloud server 16 (S406), the control unit 10a decides a detection result of the portable terminal ID of the second user and the distance to the portable terminal associated with the email address (S407). Subsequently, the control unit 10a decides the position information according to the decided distance, and decides the contact information and provision method (output format) according to the position information (S408). The control unit 10a additionally reports and provides the contact information of the second user to the first user, in accordance with the decided contact information and provision method (S409). If the provision method (output format) is display output, the control unit 10a controls the display unit 10b to display and output the contact information. If the provision method is email transmission, the control unit 10a transmits the contact information to the portable terminal of the first user through the communication I/F 10h.

FIG. 14 illustrates one example of the case of displaying the contact information of the second user on the display unit 10b. In this case, the second user is present on the same floor. The message "There is a user who has registered related information." along with the name of the second user, a face photo, and seat information on the same floor are displayed. By viewing the display, the first user is able to recognize that the second user is present on the same floor, and may meet the second user face-to-face and make contact.

Note that in the case in which the user operates an "OK" button, the control unit 10a may display the document data of the second user as related information on the display unit 10b. Also, in response to an operation from the first user, the document data of the second user may also be output as an image. In other words, the output formats of the contact information and the document data of the second user may be the same or different from each other.

FIG. 15 illustrates yet another example of the alteration table.

The alteration table is a table that stipulates an email address, a position of the portable terminal, position information, and the contact information and provision method (output format) in association with each other.

The email address is the email address of the second user, and is classified into "Registered" and "Unregistered".

The position of the portable terminal is the position of the portable terminal of the second user, and is detected by the image forming apparatus 14. The position of the portable terminal is classified into "In open area", "In security area", and "Outside the office".

The position information is position information estimated according to the position of the portable terminal, and is classified into "In open area of the office", "In security area of the office", and "Outside the office". The position of the portable terminal and the position information correspond in a substantially 1:1 manner. Herein, an open area refers to an area that unspecified users may enter and exit, whereas a security area refers to an area that only specified users may enter and exit.

The contact information and provision method are set according to the position information. If the position information is "In open area of the office", a face photo is selected as the content of the contact information, and image output is selected as the provision method (output format). If the position information is "In security area of the office", contact information is not reported in consideration of the second user being unavailable for contact, and in the case in which the first user logs in and uses the image forming apparatus 10 the next time, the position information of the second user is detected again. Similarly, if the position information is "Outside the office", contact information is not reported in consideration of the second user being unavailable for contact, and in the case in which the first user logs in and uses the image forming apparatus 10 the next time, the position information of the second user is detected again. Also, if the email address is "Unregistered" and the position information is "Outside the office", the email address is selected as the content of the contact information, and email transmission is selected as the provision method (output format).

The alteration table in FIG. 15 is for the case in which the image forming apparatus 10 is installed in the open area of the same office, while the image forming apparatus 14 is installed in the open area or the security area of the same office or outside the office. Even if the second user is inside the same office, since making contact is difficult in the case in which the second is not present in the open area, basically the contact information is reported when the second user is present in the open area. Also, in the case in which the second user is outside the office, the reason why the content of the contact information and the output format are different depending on whether the email address is registered or unregistered is that, since it may not be possible to meet the second user to begin with if the email address is unregistered, it is anticipated that contact will be made by email.

FIG. 16 illustrates yet another example of the alteration table. FIG. 16 is a partial modification of the alteration table in FIG. 15.

The alteration table in FIG. 16 is different the alteration table in FIG. 15 in the case in which the position information of the second user is "In security area of the office" and in the case in which the email address of the second user is "Registered" and the position information is "Outside the office". In the former case, "In security area" is selected as the content of the contact information, and display output is selected as the provision method (output format). In the latter case, "Outside the office" is selected as the contact information, and display output is selected as the provision method (output format).

FIG. 17 illustrates one example of the case of displaying the contact information of the second user on the display unit 10b. In this case, the second user is present in the security area inside the same office.

The message "There is a user who has registered related information." along with the name of the second user are output. Also, the message "Position: User is inside the security area and cannot be contacted right now." is displayed. By viewing these messages, the first user is able to grasp that the second user having related information is present inside the security area and is currently unavailable for contact.

Note that in FIG. 17, the message "Press the Send button to see the user's email address." is also displayed. If the first user operates a Send button, the registered email address of the second user is displayed on the display unit 10b or displayed on a portable terminal 11 of the first user. If the first user urgently wants to make contact with the second user, for example, the first user may use the email address to make contact. The email address may be the email address of a forwarding destination designated by the second user or the second user's own email address.

The foregoing exemplary embodiment describes a case in which the first user and the second user utilize the image forming apparatus 10, 12, and 14 installed in a shared office or the like, but the present disclosure is not limited thereto, and is also applicable to cases of being installed in any type of facility, such as a school, a nursing home, a hospital, or in a store.

Hereinafter, processes for the cases of being installed in a university, a nursing home, and a hospital will be described.

FIG. 18 illustrates one example of the alteration table in the case of application in a university.

The alteration table is a table that stipulates an affiliated campus, a registrant type, course completion registration information, a lecture schedule, current status information, and the contact information and provision method (output format) in association with each other.

The affiliated campus is the position information of the second user, and is classified into "Same campus" and "Other campus". In the case in which a campus contains multiple buildings, the affiliated campus may also be classified by building.

The registrant type is a classification (category) within the campus of the second user, and is classified into "Student" and "Professor". Obviously, other classifications such as "Assistant Professor", "Staff", and "Office worker" are also possible. The registrant type may be referred to as group information about the registrant.

The course completion registration information is course completion registration information about the second user in the case in which the first user is a student, and is classified into "Completed same lecture" and "Completed other lecture" in the case in which the second user is a student, and is classified into "Completed lecture by same professor" and "Completed lecture by other professor" in the case in which the second user is a professor.

The lecture schedule is the lecture schedule of the first user, and is classified into "Lecture on same day" and "Lecture on different day" in the case in which the second user is a student, and is also classified into "Lecture on same day" and "Lecture on different day" in the case in which the second user is a professor.

The current status information is information that acts as a resource for estimating the current state of the user. For example, information indicating the current status of the first user as estimated from the lecture schedule corresponds to the current status information. If the first user and the second user are both students and the lecture schedule is "Lecture on same day", the current status information is classified into "Receiving same lecture as registrant (second user) on same day", whereas if the first user and the second user are both students and the lecture schedule is "Lecture on different day", the current status information is classified into "Receiving same lecture as registrant (second user) on different day". Also, if the first user is a student, the second user is a professor, and there is no lecture schedule, the current status information is classified into "Not receiving lecture by registrant (second user).

The contact information/provision method (output format) is contact information and a provision method according to the fields from the position information to the current status information, and if the position information is "Same campus", the type is "Student", and the current status information is "Receiving same lecture as registrant on same day", the name, a face photo, and the lecture name are selected as the content of the contact information, and image output is selected as the provision method (output format). This presumes that in the case in which users are able to meet at the lecture on the same day, the first user is able to call out to the second user at the beginning or the end of the lecture. Also, if the position information is "Same campus", the type is "Professor", and the current status information is "Receiving lecture by registrant on same day", the name and the lecture name are selected as the content of the contact information, and image output is selected as the provision method (output format). The lack of a face photo as part of the content of the contact information is because if the second user is a professor, the first user is naturally able to identify the second user even without a face photo. Also, if the position information is "Same campus", the type is "Student", and the current status information is "Receiving same lecture as registrant on different day", the name, a face photo, the lecture name, and an email address are selected as the content of the contact information, and email transmission is selected as the provision method (output format). Furthermore, if the position information is "Same campus", the type is "Professor", and the current status information is "Receiving lecture by registrant on different day", the name, the lecture name, an office location, and seat information are selected as the content of the contact information, and image output is selected as the provision method (output format). This is because, in the case in which the second user is a professor, unlike a student, the first user is able to meet the second user by going to the professor's office, and therefore the office location and seat information are considered to be effective as the contact information.

In this example, the contact information is altered according to the position information of the second user, group information, and current status information.

FIG. 19 is the alteration table in the case of application to a nursing home. In this case, the first user and the second user are residents. Note that in the case in which the second user has an assigned nursing staff, since contact is made through the assigned nursing staff, the assigned nursing staff is also included as the second user.

The alteration table is a table that stipulates login information, a registrant health status, a registrant's assigned nursing staff ID, current status information, and the contact information/provision method (output format) in association with each other.

The login information is the login information of the second user, and is classified into "Authenticated user (nursing staff)" and "Guest user (resident)".

The registrant status is the health status of the second user as a resident, and is classified into "Good" and "Poor".

The registrant's assigned nursing staff is position information about the assigned nursing staff of the second user as a resident, and in the case in which the login information is "Guest user (resident)", is classified into "Inside 3 m radius" and "Outside 3 m radius".

The current status information is current status information about the second user estimated on the basis of the registrant health status and the registrant's assigned nursing staff ID, and is classified into "Registrant is contactable", "Registrant is not contactable", "Registrant's assigned nursing staff is nearby", and "Registrant's assigned nursing staff is not nearby".

The contact information/provision method (output format) is contact information and a provision method according to the fields from the login information to the current status information, and if the registrant (second user as a resident) is in a contactable state, the name is selected as the contact information, and image output is selected as the provision method (output format). Also, if the registrant (second user as a resident) is in a non-contactable state, the name and the name of the assigned nursing staff are selected as the contact information, and image output is selected as the provision method (output format). This is in consideration of how the first user is unable to contact the second user directly, and may need to make contact with the assigned nursing staff. Also, if the assigned nursing staff of the registrant (second user as a resident) is nearby, the name, the name of the assigned nursing staff, and a face photo of the assigned nursing staff are selected as the contact information, and image output is selected as the provision method (output format). Furthermore, if the assigned nursing staff of the registrant (second user as a resident) is not nearby, the name is selected as the contact information, and image output is selected as the provision method (output format). This is in consideration of how, because making contact with the assigned nursing staff is difficult, the name of the second user is output as an image to be passed to the assigned nursing staff or the like of the first user to make contact on behalf of the first user.

Figure 20:
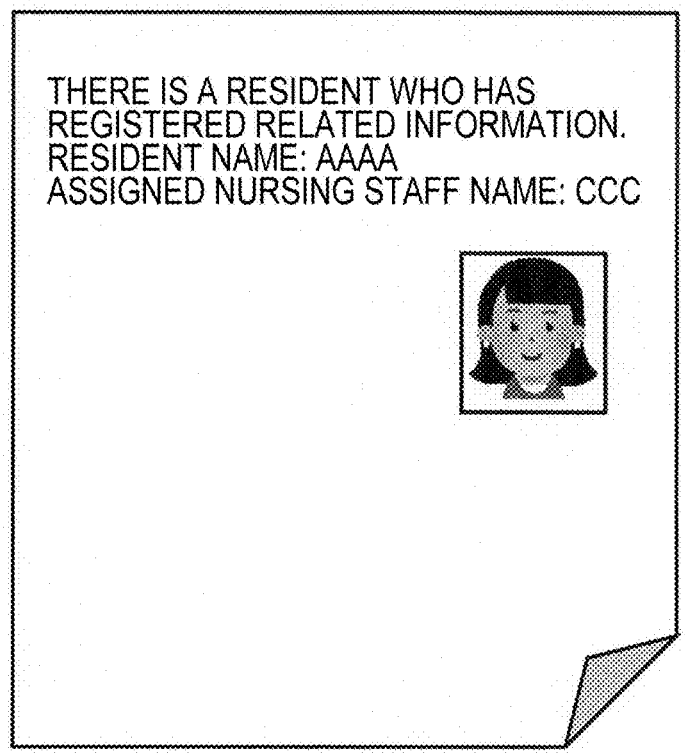
FIG. 20 is a diagram explaining yet another image output according to the exemplary embodiment.

FIG. 20 illustrates one example of image output. In this case, the second user logs in as a resident, and the assigned nursing staff is nearby. The message "There is a resident who has registered related information." is printed along with the name of the resident. Additionally, the name and a face photo of the assigned nursing staff are printed.

The first user may carry the piece of paper to meet face-to-face with the assigned nursing staff of the second user, and make contact with the second user through the assigned nursing staff.

Likewise in this example, the contact information may be altered according to the position information of the second user and current status information.

FIG. 21 illustrates one example of the alteration table in the case of application to a hospital.

The alteration table is a table that stipulates an affiliated hospital, an attendance status, a busy status, current status information, and the contact information and provision method (output format) in association with each other. The first user and the second user are both physicians or medical staff members. The second user registers, in the cloud server 16, a medical certificate regarding the disease, condition, and the like of a patient diagnosed by the second user oneself. The first user scans a clinical chart or the like with the image forming apparatus 10. When the first user scans the clinical chart or the like, the image forming apparatus 10 references the alteration table, alters the contact information of the second user, and reports the altered contact information to the first user.

The affiliated hospital is the hospital to which the second user belongs, and is classified into "Same hospital" and "Other hospital".

The attendance status is the attendance status of the second user, and is classified into "In attendance" and "Not in attendance".

The busy status is the busy status of the second user, and in the case in which the second user is "In attendance", the busy status is classified into "Busy/treating emergency" and "Not busy/not treating emergency". Whether or not the second user is treating an emergency may also be substituted with whether or not the second user is present in an intensive care unit (ICU) or an operating room.

The current status information is the current status information of the user estimated from the fields from affiliated hospital to the busy status, and is classified into "Same hospital/in attendance/busy", "Same hospital/in attendance/not busy", and "Same hospital/day off", and "Other hospital".

The contact information/provision method (output format) is the content of the contact information and a provision method according to the current status information, and if the current status information is "Same hospital/in attendance/busy", the name, medical department, and email address are selected as the content of the contact information, and email transmission is selected as the provision method (output format). This is in consideration of how, in the case in which the second user is busy (treating an emergency), making contact is difficult. Also, if the current status information is "Same hospital/in attendance/not busy", the name, medical department, and extension number are selected as the content of the contact information, and image output is selected as the provision method (output format). This is in consideration of how, if the second user is in attendance and not busy, the first user is able to meet the second user directly or use the extension number to call the second user on the telephone. If the current status information is "Same hospital/day off", the name, medical department, and email address are selected as the content of the contact information, and email transmission is selected as the provision method (output format). If the second user belongs to another hospital, the first user may be unable to make contact by meeting the second user directly, and therefore the name, hospital name, medical department, and phone number (main) are selected, and image output is selected as the provision method (output format).

Figure 22:
FIG. 22 is a diagram explaining yet another image output according to the exemplary embodiment.

FIG. 22 illustrates an example of image output. In this case, the second user is "Same hospital/in attendance/not busy". The message "There is a doctor who has registered related information." along with the doctor's name, medical department, extension number, and face photo are printed. At this point, the document data registered by the second user as related information, specifically a patient's clinical chart or the like, may also be output as an image together with the contact information.

Figure 23:
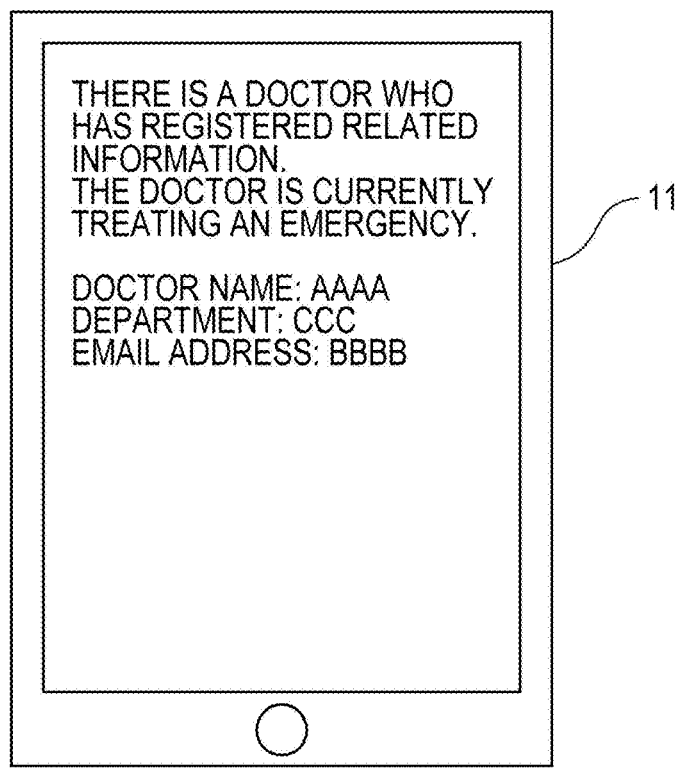
FIG. 23 is a diagram explaining yet another portable terminal output according to the exemplary embodiment.

FIG. 23 illustrates an example of email transmission to the portable terminal 11 of the first user. In this case, the second user is "Same hospital/in attendance/busy". The message "There is a doctor who has registered related information. The doctor is currently treating an emergency." along with the doctor's name, medical department, and email address are displayed. The first user may use the email address to transmit an email and make contact with the second user. Note that a link for accessing the patient's clinical chart registered by the second user as related information additionally may be displayed.

Note that obviously if the second user is busy and treating an emergency, no contact information may be reported, and in the case in which the first user logs in next time, the current status information of the second user may be detected again and the contact information may be altered. In the case in which the second user is a doctor or a medical staff member, since in many cases the second user will be busy dealing with emergencies and the like which are not part of a preset schedule, it may be effective to appropriately alter the content and output format of the contact information according to the current status information.

Likewise in this example, the contact information may be altered according to the position information and current status information of the second user, particularly according to how busy the second user is (the level of emergency).

<Exemplary Modification 1>

The exemplary embodiment describes a case in which the first user uses the image forming apparatus 10 and the second user uses the image forming apparatus 14, but the case in which the first user and the second user use the same image forming apparatus 10 at different times is also conceivable. Even in this case, the contact information of the second user may be altered and reported according to the position information of the second user at the timing when the first user operates the image forming apparatus 10.

Note that when cross-referencing the document data of the first user and the document data of the second user to determine any correlation, the creation dates and times of the document data may also be considered. This is because document data that is older than a fixed amount of time may not be considered as valid even if the keywords match, and furthermore, there may be little need to make contact with the second user associated with document data that is older than a fixed amount of time. Also, as an example of considering the creation dates and times of document data, in the case in which the first user registers multiple pieces of document data, the creation dates and times may be used as a basis for choosing which document data to present in the case in which the creation dates and times are different.

<Exemplary Modification 2>

In the exemplary embodiment, in the case of reporting the contact information of the second user to the first user, the second user may also be notified that one's contact information has been reported to the first user. with this arrangement, since the second user is able to anticipate contact from the first user, the first user may make contact with the second user more smoothly. Even in the case of notifying the second user that one's contact information has been reported to the first user, it is desirable to report the contact information in an output format according to the position information of the second user.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a controller configured to
acquire position information about a position of a second user; and
in a case of a first user making contact with the second user, when reporting contact information that is information uniquely specifying the second user, alter the contact information according to the position information and report the altered contact information to the first user.

2. The information processing apparatus according to claim 1, wherein
the contact information reported differs between a case in which the first user is within a distance from the position of the second user to make face to face contact and a case in which the first user is not within the distance from the position of the second user according to the position information.

3. The information processing apparatus according to claim 1, wherein the controller is further configured to
receive an instruction to execute a job from the first user, and
in a case in which the instruction is received, alter and report the contact information.

4. The information processing apparatus according to claim 3, wherein
the controller is configured to receive an instruction to contact the second user from the first user as the instruction, and
in a case in which the instruction to contact is received, the controller is configured to alter and report the contact information.

5. The information processing apparatus according to claim 1, wherein
the position information is usage information with respect to a piece of equipment.

6. The information processing apparatus according to claim 5, wherein
the controller is configured to alter and report the contact information according to a usage history with respect to the piece of equipment.

7. The information processing apparatus according to claim 1, wherein
the controller is configured to select and report at least one of a location of the second user, an address for contacting the second user, and image information for identifying the second user as the altered contact information.

8. The information processing apparatus according to claim 1, wherein
in a case in which the position information of the second user indicates a specific area, the controller is configured to report that the second user is present in the specific area as the altered contact information.

9. The information processing apparatus according to claim 1, wherein
in a case in which the position information of the second user indicates a specific area, the controller is configured to not report contact information.

10. The information processing apparatus according to claim 8, wherein
the specific area is an area where the first user is unable to meet the second user face-to-face or an area the first user is unable to pass through.

11. The information processing apparatus according to claim 1, wherein
the controller is configured to report the contact information in an output format altered according to the position information.

12. The information processing apparatus according to claim 1, wherein
the controller is configured to report the contact information in an output format altered according to the position information and position information about the first user.

13. The information processing apparatus according to claim 1, wherein the controller is configured to
acquire group information about a group to which the second user belongs, and alter and report the contact information according to the position information and the group information.

14. The information processing apparatus according to claim 13, wherein
the controller is configured to report the contact information in an output format altered according to the position information and the group information.

15. The information processing apparatus according to claim 1, wherein the controller is configured to
acquire current status information about the second user, and
alter and report the contact information according to the position information and the current status information.

16. The information processing apparatus according to claim 15, wherein
the controller is configured to report the contact information in an output format altered according to the position information and the current status information.

17. The information processing apparatus according to claim 1, wherein the controller is configured to
register document information provided from the second user, and
report the altered contact information and the document information.

18. The information processing apparatus according to claim 1, wherein the controller is configured to
register document information provided from the second user;
cross-reference document information provided from the second user with document information provided from the first user, and
in a case of a matching result of cross-referencing between the document information provided from the second user and the document information provided from the first user, report the altered contact information.

19. An information processing system comprising:
a first user terminal operated by a first user;
a second user terminal operated by a second user;
a server computer connected to the first user terminal and the second user terminal, wherein
the server computer comprises a controller that is configured to acquire position information about a position of the second user, and
either of the server computer and the first user terminal is configured to, in a case of the first user making contact with the second user, when reporting contact information that is information uniquely specifying the second user, alter the contact information according to the position information and report the altered contact information to the first user.

20. A non-transitory computer readable medium storing a program causing a computer to execute a process for processing information, the process comprising:
acquiring position information about a position of a second user; and
in a case of a first user making contact with the second user, when reporting contact information that is information uniquely specifying the second user, altering the contact information according to the position information and reporting the altered contact information to the first user.

* * * * *